(12) United States Patent
Nohara et al.

(10) Patent No.: US 11,319,209 B2
(45) Date of Patent: May 3, 2022

(54) METHOD OF PRODUCING CELLULOSE-NANOFIBER CARBON

(71) Applicant: Nippon Telegraph and Telephone Corporation, Tokyo (JP)

(72) Inventors: Masaya Nohara, Atsugi (JP); Shuhei Sakamoto, Atsugi (JP); Mikayo Iwata, Atsugi (JP); Masahiko Hayashi, Atsugi (JP); Takeshi Komatsu, Atsugi (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 169 days.

(21) Appl. No.: 16/636,256

(22) PCT Filed: May 30, 2018

(86) PCT No.: PCT/JP2018/020799
§ 371 (c)(1),
(2) Date: Feb. 3, 2020

(87) PCT Pub. No.: WO2019/026404
PCT Pub. Date: Feb. 7, 2019

(65) Prior Publication Data
US 2021/0163293 A1 Jun. 3, 2021

(30) Foreign Application Priority Data

Aug. 4, 2017 (JP) .............................. JP2017-151349
Aug. 4, 2017 (JP) .............................. JP2017-151350

(51) Int. Cl.
*C01B 32/15* (2017.01)
*D01F 9/16* (2006.01)

(52) U.S. Cl.
CPC .............. *C01B 32/15* (2017.08); *D01F 9/16* (2013.01); *C01P 2004/16* (2013.01)

(58) Field of Classification Search
CPC ..... C01B 32/15; C01B 32/158; C01B 32/336; C01B 32/00; C01B 32/05; D01F 9/16;
(Continued)

(56) References Cited

U.S. PATENT DOCUMENTS

2011/0117319 A1 5/2011 Yano et al.
2014/0356767 A1 12/2014 Kimura et al.
2017/0098827 A1 4/2017 Kim et al.

FOREIGN PATENT DOCUMENTS

CN 103184602 A 7/2013
CN 103806130 A 5/2014
(Continued)

OTHER PUBLICATIONS

Liang, Hai-Wei, et al. "Highly conductive and stretchable conductors fabricated from bacterial cellulose." NPG Asia Materials 4.6 (2012): e19-e19.*
(Continued)

*Primary Examiner* — Richard M Rump
(74) *Attorney, Agent, or Firm* — Kilpatrick Townsend & Stockton LLP

(57) ABSTRACT

Cellulose-nanofiber carbon which can achieve a large specific surface area, and a method of producing the same are provided. The method for heat treating a cellulose nanofiber for carbonization includes: a freezing step of freezing a solution or gel containing the cellulose nanofiber to obtain a frozen product a drying step of drying the frozen product in a vacuum to obtain a dried product and a carbonizing step of heating and carbonizing the dried product in an atmosphere which does not burn the dried product to obtain the cellulose-nanofiber carbon.

2 Claims, 10 Drawing Sheets

(58) Field of Classification Search
CPC .............. C01P 2004/16; C01P 2006/90; C01P 2006/14; C01P 2006/12
See application file for complete search history.

(56) References Cited

FOREIGN PATENT DOCUMENTS

| | | |
|---|---|---|
| CN | 103820883 A | 5/2014 |
| CN | 103966700 A | 8/2014 |
| CN | 104609394 A | 5/2015 |
| CN | 105428616 A | 3/2016 |
| JP | 11-340103 A | 12/1999 |
| JP | 5386866 B2 | 10/2013 |
| JP | 5510092 B2 | 4/2014 |
| WO | 2013/121781 A1 | 8/2013 |
| WO | 2015/109272 A1 | 7/2015 |
| WO | 2015/143497 A1 | 10/2015 |

OTHER PUBLICATIONS

International Preliminary Report on Patentability, PCT Patent Application No. PCT/JP2018/020799, dated Feb. 13, 2020.
Koon-Yang, Lee et al., "Bacterial Cellulose as Source for Activated Nanosized Carbon for Electric Double Layer Capacitors", Journal of Materials Science, 2013, vol. 48, pp. 367-376.
Iijima et al. "Single-shell carbon nanotubes of 1-nm diameter", Nature, vol. 363, Jun. 17, 1993, pp. 603-605.
Kong et al., "Chemical vapor deposition of methane for single-walled carbon nanotubes", Chemical Physics Letters, vol. 292, 1998, pp. 567-574.
Nohara et al., "Electrochemical Characteristics of Lithium Air Secondary Battery Using Ru-based Catalyst/Carbon Derived from Bacterial Cellulose as Air Electrode", Nov. 28, 2016, vol. 57, p. 545.
International Search Report, PCT Patent Application No. PCT/JP2018/020799, dated Aug. 21, 2018.
Written Opinion, PCT Patent Application No. PCT/JP2018/020799, dated Aug. 21, 2018.

\* cited by examiner

METHOD OF PRODUCING CELLULOSE-NANOFIBER CARBON

TECHNICAL FIELD

The present invention relates to cellulose-nanofiber carbon and a method of producing the same.

BACKGROUND ART

Carbon nanofibers are generally in the form of fibers having an outer diameter of 5 to 100 nm and a fiber length of 10 times the outer diameter or longer. Due to their unique shape, they have characteristics such as high conductivity and high specific surface area.

Examples of conventionally known methods for producing carbon nanofibers include an electrode discharge method, a vapor phase growth method, a laser method, and the like (Non-Patent Documents 1 and 2). In addition, for example, Patent Documents 1 and 2 disclose a method of producing cellulose nanofibers by heat treating cellulose derived from a natural product.

PRIOR ART DOCUMENT

Patent Document

Patent document 1: Japanese Patent No. 5510092
Patent document 2: Japanese Patent No. 5386866

Non-Patent Document

Non-patent document 1: S. Iijima et al. "Single-shell carbon nanotubes", Nature, Vol. 363, 17 Jun. 1993.
Non-Patent document 2: J. Kong et al. "Chemical vapor deposition of methane for single-walled carbon nanotubes", Chemical Physics Letters 292, 567-574, 1998.

SUMMARY OF THE INVENTION

Problem to be Solved by the Invention

A carbon nanofiber produced by a conventional production method has problems of the lack of elasticity to cause plastic deformation which makes it impossible to return to the original shape after compression and bending, and low mechanical strength.

In addition, in the case of obtaining a carbon material by heat treating cellulose nanofibers, the cellulose nanofibers agglomerate during drying and sinter during heat treatment, resulting in a dense carbon material. Therefore, there is a problem that it is difficult to obtain the carbon material with large specific surface area.

The present invention has been made in view of the above problem, and an objective thereof is to provide cellulose-nanofiber carbon which has stretchability and high mechanical strength and can achieve a large specific surface area, and a method of producing the same.

Means for Solving the Problem

It is summarized that a method of producing cellulose-nanofiber carbon according to an aspect of the present invention is a method of producing cellulose-nanofiber carbon by carbonizing a cellulose nanofiber, the method comprising: a freezing step of freezing a solution or gel containing the cellulose nanofiber to obtain a frozen product; a drying step of drying the frozen product in a vacuum to obtain a dried product; and a carbonizing step of heating and carbonizing the dried product in an atmosphere which does not burn the dried product.

In addition, it is summarized that cellulose-nanofiber carbon according to an aspect of the present invention comprises a three-dimensional network structure which is a co-continuum formed by connecting cellulose nanofibers.

In addition, cellulose-nanofiber carbon according to an aspect of the present invention comprises a three-dimensional network structure which is a co-continuous body formed by connecting nanofibers of bacterially produced cellulose.

Effect of the Invention

The present invention makes it possible to provide cellulose-nanofiber carbon which has stretchability and high mechanical strength and can achieve a large specific surface area, and a method of producing the same.

MODE FOR CARRYING OUT THE INVENTION

Hereinafter, embodiments of the present invention are described with reference to the drawings.

First Embodiment

Figure 1:
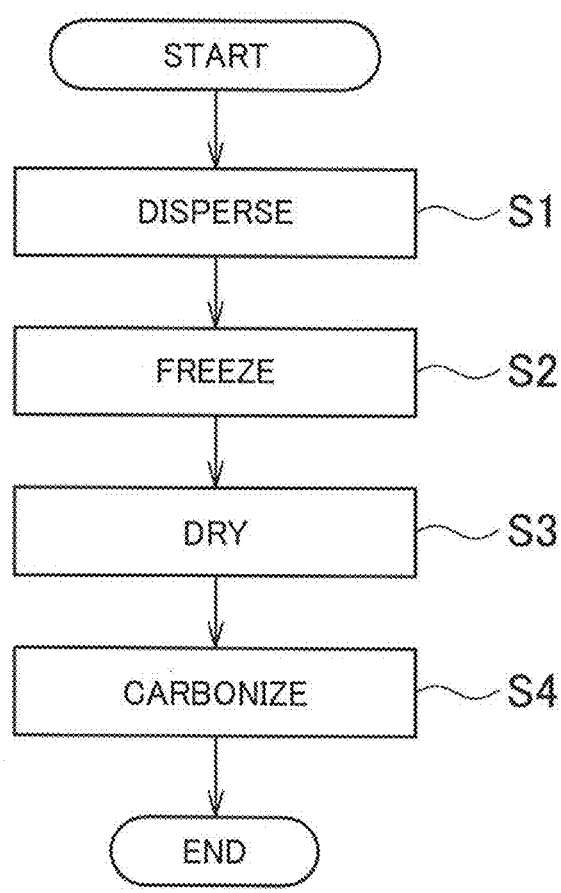
FIG. 1 is a flowchart illustrating a method of producing cellulose-nanofiber carbon according to a first embodiment of the present invention.

FIG. 1 is a flowchart illustrating a method of producing cellulose-nanofiber carbon according to a first embodiment of the present invention. In the following description, cellulose-nanofiber carbon may be referred to as a carbon material.

The method of producing cellulose-nanofiber carbon of the present embodiment includes a dispersing step (step S1), a freezing step (step S2), a drying step (step S3), and a carbonizing step (step S4). This production method requires a cellulose-nanofiber solution.

The form of the cellulose nanofibers in the cellulose-nanofiber solution is preferably a dispersed form. Thus, the production process illustrated in FIG. 1 includes a dispersing step (step S1), but does not have to include the dispersing step (step S1). That is, this step is unnecessary when using a solution having cellulose nanofibers dispersed therein.

The dispersing step disperses the cellulose nanofibers contained in the cellulose-nanofiber solution. The dispersion medium is an aqueous dispersion medium such as water ($H_2O$) or an organic dispersion medium such as carboxylic acid, methanol ($CH_3OH$), ethanol ($C_2H_5OH$), propanol ($C_3H_7OH$), n-butanol, isobutanol, n-butylamine, dodecane, an unsaturated fatty acid, ethylene glycol, heptane, hexadecane, isoamyl alcohol, octanol, isopropanol, acetone, or glycerin. Two or more of these may be mixed.

For the dispersion of cellulose nanofibers, it suffices to use, for example, a homogenizer, an ultrasonic cleaner, an ultrasonic homogenizer, a magnetic stirrer, a stirrer, a shaker, or the like.

In addition, the solid content concentration of the cellulose nanofibers in the cellulose-nanofiber solution is preferably 0.001 to 80% by mass and more preferably 0.01 to 30% by mass.

The freezing step freezes the nanofiber-containing solution to obtain a frozen product (step S2). This step is carried out by, for example, storing the cellulose-nanofiber solution in a suitable container such as a test tube, cooling the environment around the test tube in a coolant such as liquid nitrogen, and thereby freezing the cellulose nanofibers stored in test tube.

The freezing method is not particularly limited as long as the dispersion medium of the solution can be cooled to the freezing point or lower, and the dispersion medium may be cooled in a freezer or the like. When the cellulose-nanofiber solution is frozen, the dispersion medium loses fluidity and the cellulose nanofibers as a dispersoid are fixed, which constructs a three-dimensional network structure.

The drying step dries the frozen product, frozen in the freezing step, in a vacuum to obtain a dried product (step S3). This step sublimates the frozen dispersion medium from the solid state, and is carried out by, for example, storing the obtained frozen product in a suitable container such as a flask and evacuating the container. When the frozen product is placed in a vacuum atmosphere, the sublimation point of the dispersion medium is lowered, making it possible to sublimate even a substance which does not sublime at normal pressure.

The degree of vacuum in the drying step varies depending on the dispersion medium used, but is not particularly limited as long as the degree of vacuum allows sublimation of the dispersion medium. For example, when water is used as a dispersion medium, the degree of vacuum needs to be adjusted to a pressure of 0.06 MPa or less, but it takes time to dry because heat is taken away as latent heat of sublimation. For this reason, the degree of vacuum is preferably $1.0 \times 10^{-6}$ Pa to $1.0 \times 10^{-2}$ Pa. Moreover, heat may be applied using a heater or the like during drying.

The carbonizing step heats and carbonizes the dried product, dried in the drying step, in an atmosphere which does not burn the dried product, thereby obtaining cellulose-nanofiber carbon (step S4). The cellulose nanofibers may be carbonized by being fired at 200° C. to 2000° C. and more preferably 600° C. to 1800° C. in an inert gas atmosphere. The gas which does not burn cellulose may be, for example, an inert gas such as nitrogen gas or argon gas. In addition, the gas which does not burn cellulose may be a reducing gas such as hydrogen gas or carbon monoxide gas, or may be carbon dioxide gas. Carbon dioxide gas or carbon monoxide gas is more preferable, which has an activation effect on the carbon material and can be expected in terms of high activation.

In the method of producing cellulose-nanofiber carbon described above, the freezing step fixes the cellulose nanofibers as a dispersoid to construct a three-dimensional network structure. In addition, the drying step makes it possible to take out the cellulose nanofibers while maintaining the three-dimensional network structure. Therefore, a sufficient specific surface area can be obtained, and the preparation of a carbon material with a high specific surface area is facilitated.

Figure 2A:
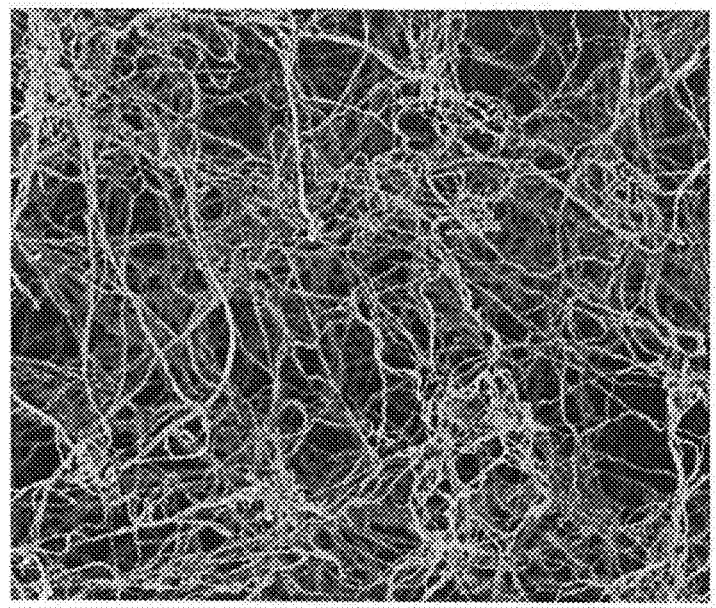
FIG. 2A is an SEM image of cellulose-nanofiber carbon prepared by the production method of the first embodiment.
Figure 2B:
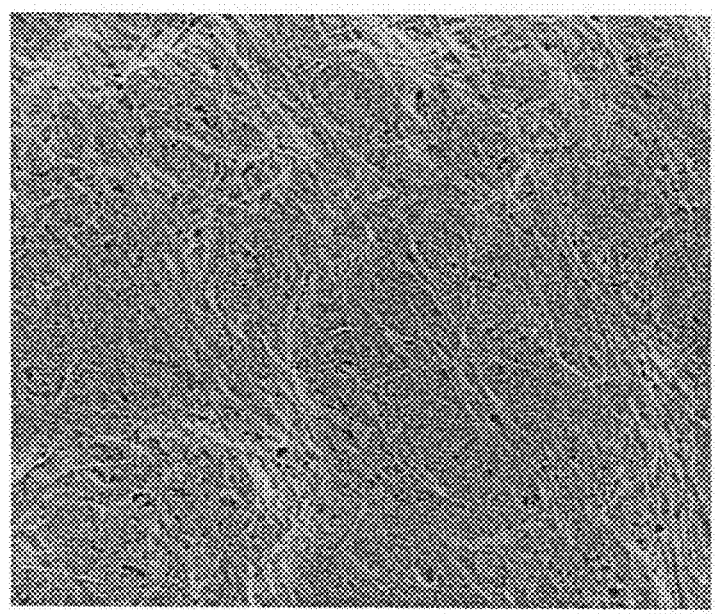
FIG. 2B is an SEM image of a carbon material prepared by a production method different from that of the first embodiment.

FIG. 2A and FIG. 2B each are an SEM (Scanning Electron Microscope) image of cellulose-nanofiber carbon. The magnification is 10000 times.

FIG. 2A is an SEM image of cellulose-nanofiber carbon prepared by the production method of the present embodiment. The image shows that cellulose nanofibers have been fixed and a three-dimensional network structure has been constructed.

FIG. 2B illustrates the state of cellulose-nanofiber carbon in the case of drying and carbonization in the atmosphere, unlike the production method of the present embodiment. Since the frozen product changes from solid to liquid and from liquid to gas, the three-dimensional network structure of cellulose nanofibers is destructed. If the three-dimensional network structure is destructed as illustrated in FIG. 2B, it is difficult to prepare a carbon material having a high specific surface area.

As described above, the cellulose-nanofiber carbon prepared by the production method of the present embodiment is a carbon material which has a three-dimensional network structure which is a co-continuum formed by connecting cellulose nanofibers, and has stretchability. In addition, the cellulose-nanofiber carbon of the present embodiment has high conductivity, corrosion resistance, and a high specific surface area.

Therefore, the cellulose-nanofiber carbon prepared by the production method of the present embodiment is suitable for batteries, capacitors, fuel cells, biofuel cells, microbial batteries, catalysts, solar cells, semiconductor manufacturing processes, medical instruments, beauty instruments, filters, heat resistant materials, flame resistant materials, heat insulating materials, conductive materials, electromagnetic wave shielding materials, electromagnetic wave noise absorbing materials, heating elements, microwave heating elements, cone paper, clothes, carpets, mirror fogging prevention, sensors, touch panels, and the like.

Second Embodiment

Figure 3:
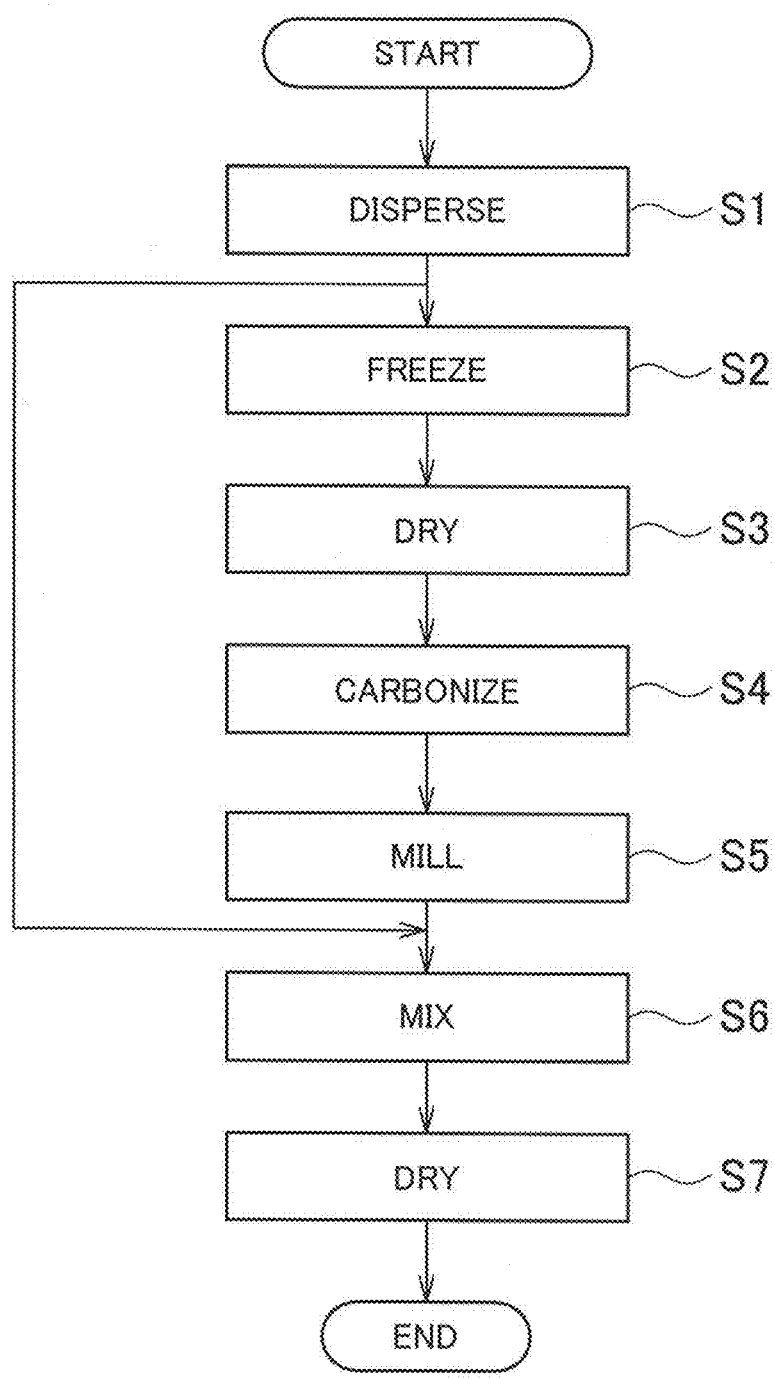
FIG. 3 is a flowchart illustrating a method of producing cellulose-nanofiber carbon according to a second embodiment of the present invention.

FIG. 3 is a flowchart illustrating a method of producing cellulose-nanofiber carbon according to a second embodiment. The production method illustrated in FIG. 3 includes, in addition to the production method of the first embodiment, a milling step (step S5), a mixing step (step S6), and a drying step (step S7).

The dried product (cellulose-nanofiber carbon) carbonized in the above-described carbonizing step (step S4) is milled in the milling step (step S5). The milling step turns the cellulose-nanofiber carbon into a powder form or a slurry form using, for example, a mixer, a homogenizer, an ultrasonic homogenizer, a high speed rotary shear stirrer, a colloid mill, a roll mill, a high pressure jet disperser, a rotating ball mill, a vibrating ball mill, a planetary ball mill, an attritor, or the like.

In this case, the cellulose-nanofiber carbon has a secondary particle diameter of preferably 10 nm to 20 mm and more preferably 50 nm to 1 mm. The reason is as follows. When milled to a secondary particle size of 10 nm or less, the co-continuous structure of cellulose nanofibers is broken, which makes it difficult to obtain a sufficient binding force and conductive path. As a result, electrical resistance increases. Meanwhile, if the secondary particle diameter is 20 mm or more, the cellulose nanofibers functioning as a binder are not sufficiently dispersed, making it difficult to maintain a sheet shape.

In addition, cellulose-nanofiber carbon has a high porosity and a low density. For this reason, if cellulose-nanofiber carbon is milled alone, the powder of cellulose-nanofiber carbon flies during milling or after milling, resulting in difficult handling. Therefore, it is preferable that cellulose-nanofiber carbon be impregnated with a solvent and then milled. The solvent used here is not particularly limited, and is, for example, an aqueous solvent such as water ($H_2O$) or an organic solvent such as carboxylic acid, methanol ($CH_3OH$), ethanol ($C_2H_5OH$), propanol ($C_3H_7OH$), n-butanol, isobutanol, n-butylamine, dodecane, an unsaturated fatty acid, ethylene glycol, heptane, hexadecane, isoamyl alcohol, octanol, isopropanol, acetone, or glycerin. Two or more of these may be mixed.

In the mixing step, the material milled in the milling step (step S5) and the cellulose-nanofiber solution dispersed in the dispersing step (step S1) are mixed to obtain a liquid mixture (step S6). The liquid mixture is in a slurry form, and by drying this slurry mixture, the cellulose-nanofiber carbon can be processed into a sheet form.

The drying step removes the liquid from the liquid mixture (step S7). Drying of the slurry-from liquid mixture (slurry mixture) may involve use of a thermostatic chamber, a vacuum dryer, an infrared dryer, a hot air dryer, a suction dryer, or the like. Moreover, rapid drying is possible by suction filtration using an aspirator or the like.

The slurry mixture obtained by the production method of the present embodiment described above may be dried to form a sheet and then processed into a desired shape. If the slurry mixture is applied as a coat in a preferred shape and then dried, the sheet-form carbon material can be processed into a desired shape. By applying in a preferred shape, it is possible to reduce the material cost such as cut ends generated by cutting process, and it is possible to obtain a carbon material having a preferred shape according to the user's preference. In addition, it is possible to increase the strength of the carbon material.

Note that the production method of the present embodiment does not have to include all processes. For example, one may use milled cellulose-nanofiber carbon subjected to the milling step and earlier steps. The term "use" means distribution in that state. Similarly, the process may be performed up to the mixing step for distribution in the form of a slurry mixture.

For the purpose of confirming the effects of the production methods of the first embodiment and the second embodiment described above, experiments were conducted for comparing the carbon materials prepared by the production methods of the first embodiment and the second embodiment (Experimental Examples 1 to 3) with the carbon materials prepared by production methods different from the embodiments (Comparative Examples 1 and 2).

Experimental Example 1

By use of cellulose nanofibers (manufactured by NIPPON PAPER INDUSTRIES CO., LTD.), cellulose nanofibers in an amount of 1 g and ultrapure water in an amount of 10 g were stirred with a homogenizer (manufactured by SMT CO., LTD.) for 12 hours to prepare a dispersion liquid of cellulose nanofibers, which was poured into a test tube.

The test tube was immersed in liquid nitrogen for 30 minutes to completely freeze the cellulose-nanofiber solution. After completely freezing the cellulose-nanofiber solution, the frozen cellulose-nanofiber solution was taken out on a Petri dish, which was dried in a vacuum of 10 Pa or less with a freeze dryer (manufactured by TOKYO RIKAKIKAI CO., LTD.) to obtain a dried product of cellulose nanofiber. After drying in a vacuum, the cellulose nanofibers were carbonized by being fired at 600° C. for 2 hours in a nitrogen atmosphere, to thereby prepare the carbon material of Experimental Example 1.

Experimental Example 2

The carbon material prepared in Experimental Example 1 was immersed with water, and then the carbon material and the cellulose-nanofiber solution (the weight ratio carbon material:cellulose-nanofiber solution was 1:1) were stirred for 12 hours with a homogenizer (manufactured by SMT CO., LTD.) to perform milling and mixing. This mixture was in a slurry form, and suction filtered using an aspirator (manufactured by SIBATA SCIENTIFIC TECHNOLOGY LTD.), and the carbon material was peeled from the filter paper. Thereafter, the carbon material was placed in a thermostatic chamber and subjected to drying treatment at 60° C. for 12 hours to prepare the carbon material of Experimental Example 2.

Experimental Example 3

Only the skin portion of the carbon material prepared in Experimental Example 1 was peeled off using a cutter or the like to prepare the carbon material of Experimental Example 3. That is, the surface of the carbon material prepared in Experimental Example 1 was removed to prepare the carbon material of Experimental Example 3.

Comparative Example 1

Comparative Example 1 is a carbon material prepared by normal drying without performing the above freezing step and the drying step.

In Comparative Example 1, the cellulose-nanofiber solution prepared in Experimental Example 1 was poured into a Petri dish, placed in a thermostatic chamber, and subjected to drying treatment at 60° C. for 12 hours. Thereafter, the cellulose nanofibers were carbonized by being fired at 600° C. for 2 hours under a nitrogen atmosphere, to thereby prepare a carbon material.

Comparative Example 2

The carbon material prepared in Comparative Example 1 (normal drying) was immersed with water, and then the carbon material and the cellulose-nanofiber solution (the weight ratio carbon material:cellulose-nanofiber solution was 1:1) were stirred for 12 hours with a homogenizer (manufactured by SMT CO., LTD.) to perform milling and mixing. This mixture was in a slurry form, and suction filtered using an aspirator (manufactured by SIBATA SCIENTIFIC TECHNOLOGY LTD.), and the carbon material was peeled from the filter paper. Thereafter, the carbon material was placed in a thermostatic chamber and subjected to drying treatment at 60° C. for 12 hours to prepare the carbon material of Comparative Example 2.
(Evaluation Method)

The obtained carbon materials were evaluated by performing XRD measurement, SEM observation, porosity measurement, tensile test, and BET specific surface area measurement. These carbon materials were confirmed to be single phase carbon (C, PDF card No. 01-071-4630) by XRD measurement. Note that the PDF card No is a card number in the PDF (Powder Diffraction File), which is a database collected by the International Centre for Diffraction Data (ICDD).

FIG. 4A to FIG. 4E illustrate SEM images of the prepared carbon materials. In addition, Table 1 presents the evaluation values obtained by measurement.

Figure 4A:
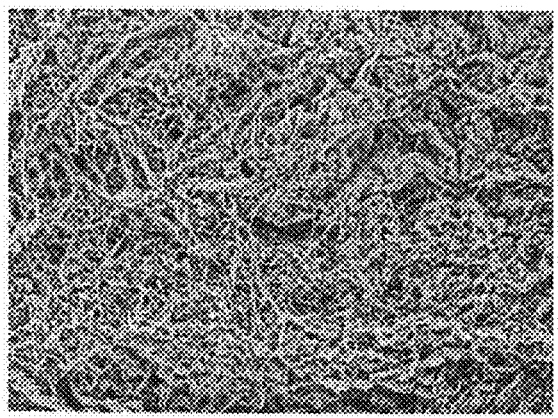
FIG. 4A is an SEM image of a skin portion of a carbon material obtained in Experimental Example 1.
Figure 4B:
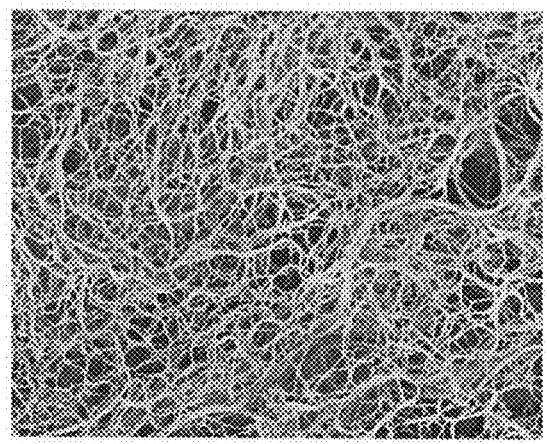
FIG. 4B is an SEM image of a cross section of the carbon material obtained in Experimental Example 1.
Figure 4C:
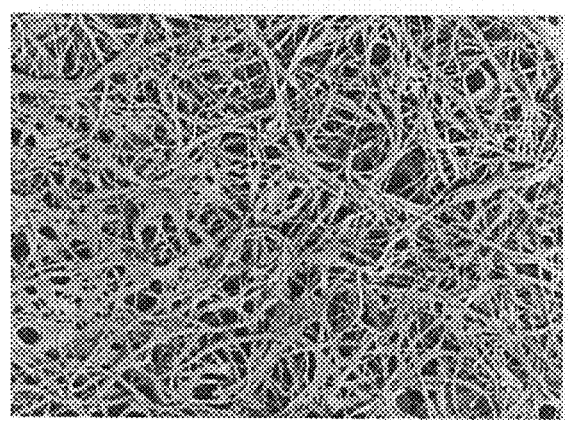
FIG. 4C is an SEM image of a carbon material obtained in Experimental Example 2.
Figure 4D:
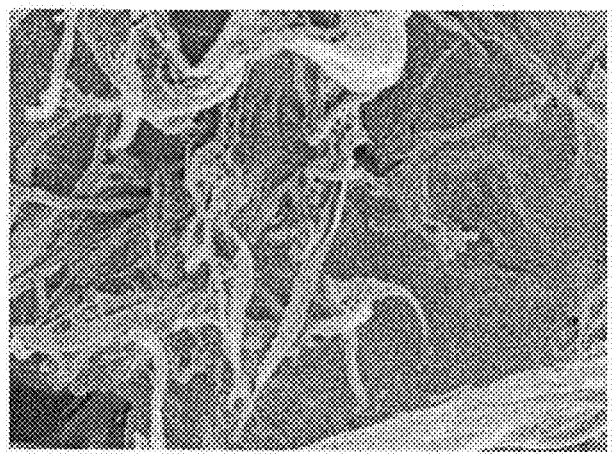
FIG. 4D is an SEM image of a carbon material obtained in Comparative Example 1.
Figure 4E:
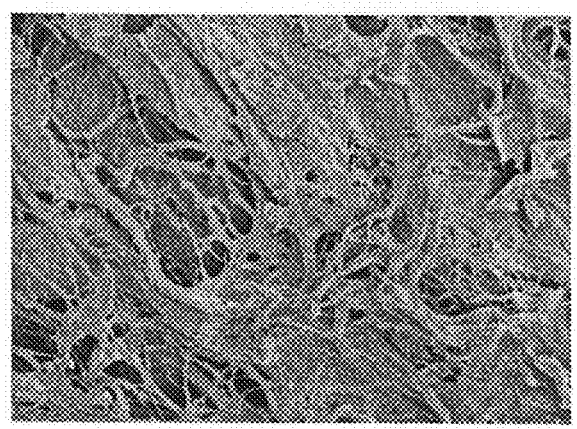
FIG. 4E is an SEM image of a carbon material obtained in Comparative Example 2.

FIG. 4A to FIG. 4E are SEM images of the carbon materials obtained in Experimental Examples 1 and 2 and Comparative Examples 1 and 2. FIG. 4A is an SEM image of the skin portion (surface) of the carbon material obtained in Experimental Example 1. As illustrated in FIG. 4A, agglomeration is observed in part of the skin portion of the carbon material of Experimental Example 1. FIG. 4B is an SEM image of a cross section cut to remove the skin portion of the carbon material of FIG. 4A. FIG. 4C is an SEM image of the surface of the carbon material obtained in Experimental Example 2. FIG. 4D is an SEM image of the surface of the carbon material obtained in Comparative Example 1. FIG. 4E is an SEM image of the surface of the carbon material obtained in Comparative Example 2. In any of the images, the magnification is 10000 times.

As illustrated in FIG. 4B and FIG. 4C (Experimental Examples 1 and 2), it can be confirmed that the carbon materials obtained by the production methods of the first embodiment and the second embodiment are a co-continuum formed by continuously connecting nanofibers having a fiber diameter of several tens of nm.

Meanwhile, as illustrated in FIG. 4D and FIG. 4E (Comparative Examples 1 and 2), it can be confirmed that the carbon materials obtained by normally drying the cellulose nanofiber-solution are a carbon material having no pores and densely agglomerated.

As presented in Table 1, the carbon materials of the first embodiment and the second embodiment (Experimental Examples 1 and 2) can more suppress agglomeration caused by the surface tension of water accompanying evaporation of the dispersion medium, as compared to Comparative Examples 1 and 2 which perform normal drying. As a result, it has been confirmed that it is possible to provide a carbon material which has excellent performance with a high specific surface area and a high porosity.

In addition, Experimental Example 3 is a carbon material prepared by peeling the skin portion of the carbon material produced in Experimental Example 1 (FIG. 4A). The SEM image of Experimental Example 3 is the same as FIG. 4B. Thus, the carbon material of Experimental Example 3 has excellent performance with a high specific surface area and a high porosity. This is considered to be due to removal of the agglomerates in the skin portion observed in part of the skin portion of the carbon material obtained by the production method of Experimental Example 1 as illustrated in FIG. 4A.

TABLE 1

| Experimental Example/ Comparative Example | SEM Observation Result | Specific Surface Area | Porosity | Tensile Strength |
|---|---|---|---|---|
| Experimental Example 1 | co-continuous Structure of 20 nmφ | 780 m²/g | 90% or more | restored to original shape even when 80% strain was applied |
| Experimental Example 2 | co-continuous Structure of 30 nmφ | 520 m²/g | 80% or more | confirmed to withstand tensile stress of 300 MPa |
| Comparative Example 1 | Condensed Carbon Material without Pores | 1 m²/g | 10% or less | broken at tensile stress of 1 MPa or less |
| Comparative Example 2 | Condensed Carbon Material without Pores | 5 m²/g | 10% or less | — |
| Experimental Example 3 | co-continuous Structure of 15 nmφ | 1020 m²/g | 98% or more | restored to original shape even when 80% strain was applied |

It has been confirmed that, as presented in Table 1, Experimental Example 1 has excellent stretchability even after carbonization. In addition, it has been confirmed that Experimental Example 2 has an excellent tensile strength.

As described above, the production method of the present embodiment, which includes a freezing step of freezing a cellulose nanofiber-containing solution to obtain a frozen product, a drying step of drying the frozen product in a vacuum to obtain a dried product, and a carbonizing step of heating and carbonization in a gas atmosphere which does not burn the dried product, heat treats cellulose nanofibers for carbonization and thus makes it possible to obtain an excellent specific surface area, strength, and porosity.

The carbon material produced by the production methods of the first embodiment and the second embodiment can also use cellulose derived from natural products, and has an extremely low environmental load. Since such a carbon material can be easily disposed of in daily life, it can be effectively used in various situations including small devices, sensor terminals, medical instruments, batteries, beauty instruments, fuel cells, biofuel cells, microbial batteries, capacitors, catalysts, solar cells, semiconductor manufacturing processes, filters, heat resistant materials, flame resistant materials, heat insulating materials, conductive materials, electromagnetic wave shielding materials, electromagnetic wave noise absorbing materials, heating elements, microwave heating elements, cone paper, clothes, carpets, mirror fogging prevention, sensors, touch panels, and the like.

Third Embodiment

The third embodiment and the fourth embodiment to be described later use a cellulose nanofiber-containing gel instead of the cellulose nanofiber-containing solution of the first embodiment. In addition, the gel of the third embodiment and the fourth embodiment is a bacterially produced gel in which cellulose nanofibers are dispersed using bacteria. For this reason, cellulose-nanofiber carbon produced by the production methods of the third embodiment and the fourth embodiment is called bacterially produced cellulose carbon in the subsequent description.

Figure 5:
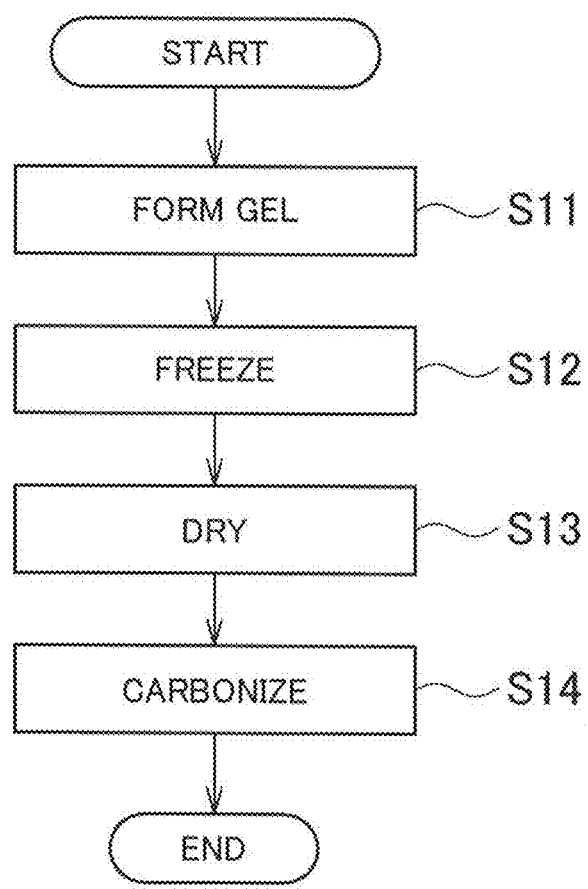
FIG. 5 is a flowchart illustrating a method of producing bacterially produced cellulose carbon according to a third embodiment of the present invention.

FIG. 5 is a flowchart illustrating a method of producing bacterially produced cellulose carbon according to a third embodiment of the present invention. In the following description, the bacterially produced cellulose carbon may be referred to as a carbon material.

The method of producing bacterially produced cellulose carbon of the present embodiment includes a gel generating step (step S11), a freezing step (step S12), a drying step (step S3), and a carbonizing step (step S14).

The gel generating step generates a bacterially produced gel in which cellulose nanofibers are dispersed using bacteria (step S11). Here, the gel means a dispersion medium that has lost its fluidity into a solid state due to the three-dimensional network structure of a nanostructure as a dispersoid, and specifically means a dispersed system having a shear modulus of 102 to 106 Pa. The dispersion medium of the gel is an aqueous dispersion medium such as water ($H_2O$) or an organic dispersion medium such as carboxylic acid, methanol (CH3OH), ethanol (C2H5OH), propanol (C3H7OH), n-butanol, isobutanol, n-butylamine, dodecane, an unsaturated fatty acid, ethylene glycol, heptane, hexadecane, isoamyl alcohol, octanol, isopropanol, acetone, or glycerin. Two or more of these may be mixed.

The gel produced by bacteria has nm-order nanofibers as the basic structure, and if this gel is used to prepare a carbon material, the resulting carbon material has a high specific surface area. Specifically, a gel produced by bacteria can be used to synthesize a carbon material having a specific surface area of 300 m2/g or more.

The bacterially produced gel has a structure in which nanofibers are entangled in a coil shape or a network shape, and further has a structure in which nanofibers are branched based on the growth of bacteria. Therefore, the carbon material prepared achieves excellent stretchability with a strain at the elastic limit of 50% or more.

The bacteria include known ones, and examples thereof include ones produced by culturing acetic acid bacteria such as *Acetobacter xylinum* subsp. *sucrofermentans*, *Acetobacter xylinum* ATCC 23768, *Acetobacter xylinum* ATCC 23769, *Acetobacter pasteurianus* ATCC 10245, *Acetobacter xylinum* ATCC 14851, *Acetobacter xylinum* ATCC 11142, or *Acetobacter xylinum* ATCC 10821. In addition, the bacteria may be produced by culturing various mutant strains created by mutating the above acetic acid bacteria by a known method using NTG (nitrosoguanidine) or the like.

The freezing step freezes the bacterially produced gel to obtain a frozen product (step S12). The freezing step is carried out by, for example, storing the bacterially produced gel in a suitable container such as a test tube, cooling the environment around the test tube in a coolant such as liquid nitrogen, and thereby freezing the bacterially produced gel stored in test tube. The freezing method is not particularly limited as long as the dispersion medium of the gel can be cooled to the freezing point or lower, and the dispersion medium may be cooled in a freezer or the like.

When the bacterially produced gel is frozen, the dispersion medium loses fluidity and the cellulose nanofibers as a dispersoid are fixed, which constructs a three-dimensional network structure.

The drying step dries the frozen product in a vacuum to obtain a dried product (bacterially produced xerogel) (step S13). The drying step dries the frozen product obtained in the freezing step in a vacuum and sublimates the frozen dispersion medium from the solid state, and is carried out by, for example, storing the obtained frozen product in a suitable container such as a flask and evacuating the container. When the frozen product is placed in a vacuum atmosphere, the sublimation point of the dispersion medium is lowered, making it possible to sublime even a substance which does not sublime at normal pressure.

The degree of vacuum in the drying step varies depending on the dispersion medium used, but is not particularly limited as long as the degree of vacuum allows sublimation of the dispersion medium. For example, when water is used as a dispersion medium, the degree of vacuum needs to be adjusted to a pressure of 0.06 MPa or less, but it takes time to dry because heat is taken away as latent heat of sublimation. For this reason, the degree of vacuum is preferably $1.0 \times 10^{-6}$ to $1.0 \times 10^{-2}$ Pa. Moreover, heat may be applied using a heater or the like during drying.

The carbonizing step heats and carbonizes the dried product (bacterially produced xerogel) in an atmosphere which does not burn the dried product, thereby obtaining bacterially produced cellulose carbon (step S14). The bacterially produced xerogel may be carbonized by being fired at 500° C. to 2000° C. and more preferably 900° C. to 1800° C. in an inert gas atmosphere. The gas which does not burn cellulose may be, for example, an inert gas such as nitrogen gas or argon gas. In addition, the gas which does not burn cellulose may be a reducing gas such as hydrogen gas or carbon monoxide gas, or may be carbon dioxide gas. In the present embodiment, carbon dioxide gas or carbon monoxide gas is more preferable, which has an activation effect on the carbon material and can be expected in terms of high activation.

In the method of producing bacterially produced cellulose carbon described above, the freezing step fixes the cellulose nanofibers as a dispersoid to construct a three-dimensional network structure. In addition, the drying step makes it possible to take out the cellulose nanofibers while maintaining the three-dimensional network structure. Therefore, a sufficient specific surface area can be obtained, and the production of a carbon material with a high specific surface area is facilitated.

Figure 6A:
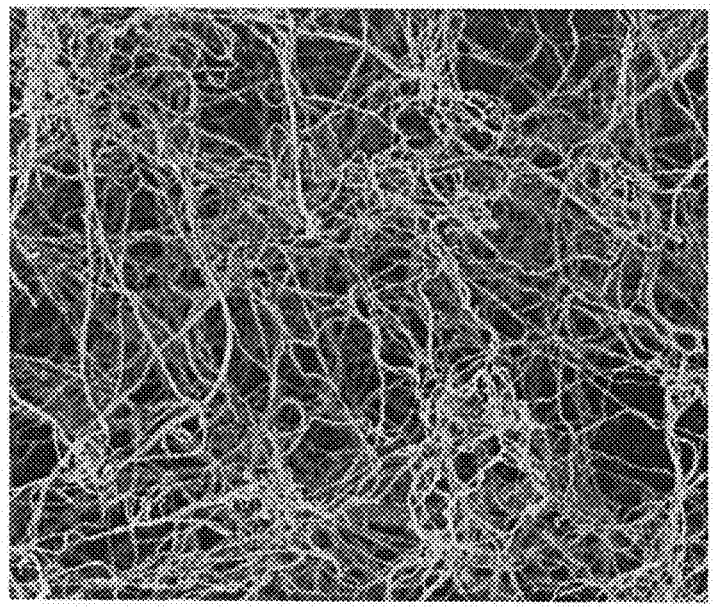
FIG. 6A is an SEM image of bacterially produced cellulose carbon prepared by the production method of the third embodiment.
Figure 6B:
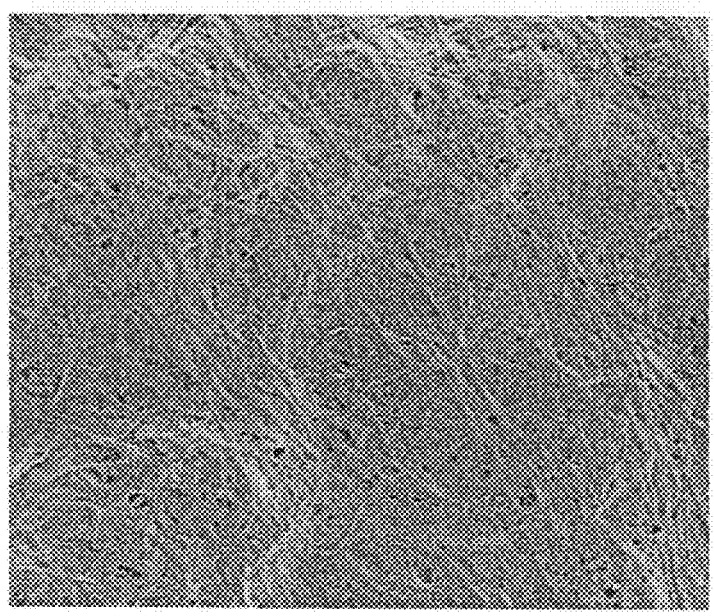
FIG. 6B is an SEM image of a carbon material prepared by a production method different from that of the third embodiment.

FIG. 6A and FIG. 6B each are an SEM image of cellulose-nanofiber carbon. The magnification is 10000 times.

FIG. 6A is an SEM image of bacterially produced cellulose carbon produced by the production method of the present embodiment. The image shows that cellulose nanofibers have been fixed and a three-dimensional network structure has been constructed.

FIG. 6B illustrates the state of the carbon material in the case of drying and carbonization in the atmosphere, unlike the production method of the present embodiment. Since the frozen product changes from solid to liquid and from liquid to gas, the three-dimensional network structure of cellulose nanofibers is destructed. If the three-dimensional network structure is destructed as illustrated in FIG. 6B, it is difficult to produce a carbon material having a high specific surface area.

As described above, the bacterially produced cellulose carbon prepared by the production method of the present embodiment is a carbon material which has a three-dimensional network structure and has stretchability. In addition, the bacterially produced cellulose carbon of the present embodiment has high conductivity, corrosion resistance, and a high specific surface area.

Therefore, the bacterially produced cellulose carbon prepared by the production method of the present embodiment can improve adhesion with electrodes, voids, biological tissues, device connection parts, and the like. Since the bacterially produced cellulose carbon of the present embodiment has high conductivity, corrosion resistance, and high specific surface area, it is suitable for batteries, capacitors, fuel cells, biofuel cells, microbial batteries, catalysts, solar cells, semiconductor manufacturing processes, medical instruments, beauty instruments, filters, heat resistant materials, flame resistant materials, heat insulating materials, conductive materials, electromagnetic wave shielding materials, electromagnetic wave noise absorbing materials, heating elements, microwave heating elements, cone paper, clothes, carpets, mirror fogging prevention, sensors, touch panels, and the like.

Fourth Embodiment

Figure 7:
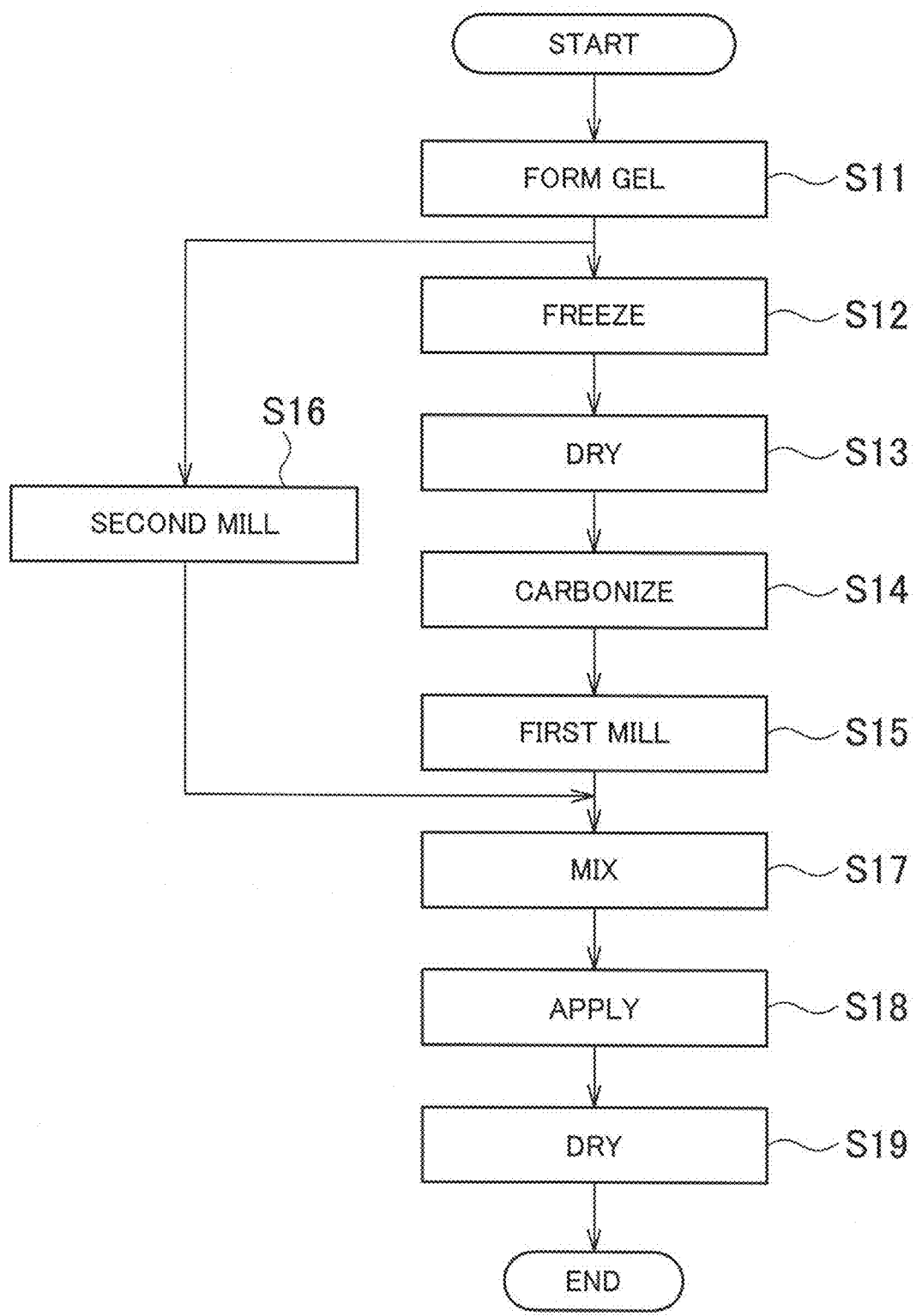
FIG. 7 is a flowchart illustrating a method of producing bacterially produced cellulose carbon according to a fourth embodiment of the present invention.

FIG. 7 is a flowchart illustrating a method of producing bacterially produced cellulose carbon according to a fourth embodiment. The production method illustrated in FIG. 7 includes, in addition to the production method of the third embodiment, a first milling step (step S15), a second milling step (step S16), a mixing step (step S17), an applying step (step S18), and a drying step (step S19).

The dried product (bacterially produced cellulose carbon) carbonized in the carbonizing step (step S14) is milled in the first milling step (step S15). The first milling step turns the bacterially produced cellulose carbon into a powder form or a slurry form using, for example, a mixer, a homogenizer, an ultrasonic homogenizer, a high speed rotary shear stirrer, a colloid mill, a roll mill, a high pressure jet disperser, a rotating ball mill, a vibrating ball mill, a planetary ball mill, an attritor, or the like. In this case, the bacterially produced cellulose carbon has a secondary particle diameter of preferably 100 nm to 5 mm and more preferably 1 μm to 1 mm. The reason is as follows. When milled to a secondary particle size of 100 nm or less, the co-continuous structure of cellulose nanofibers is broken, which makes it difficult to obtain a sufficient binding force and conductive path. As a result, electrical resistance increases. Meanwhile, if the secondary particle diameter is 5 mm or more, the bacterially produced gel functioning as a binder is not sufficiently dispersed, making it difficult to maintain a sheet shape.

In addition, bacterially produced cellulose carbon has a high porosity and a low density. For this reason, if the carbon material is milled alone, the powder of bacterially produced cellulose carbon flies during milling or after milling, resulting in difficult handling. Therefore, it is preferable that bacterially produced cellulose carbon be impregnated with a solvent and then milled. The solvent used here is not particularly limited, and is, for example, an aqueous solvent such as water ($H_2O$) or an organic solvent such as carboxylic acid, methanol ($CH_3OH$), ethanol ($C_2H_5OH$), propanol ($C_3H_7OH$), n-butanol, isobutanol, n-butylamine, dodecane, an unsaturated fatty acid, ethylene glycol, heptane, hexadecane, isoamyl alcohol, octanol, isopropanol, acetone, or glycerin. Two or more of these may be mixed.

In the second milling step, the bacterially produced gel generated in the gel generating step is milled (step S16). Note that it is also possible to simultaneously mill the bacterially produced gel and the bacterially produced cellulose carbon. In that case, the mixing step can be omitted.

In the mixing step, the materials milled in the first milling step and the second milling step are mixed (step S17). The mixture is in a slurry form.

The applying step forms the slurry-form mixture into a preferred shape (step S18).

In the drying step, the liquid is removed from the mixture formed (applied) in the applying step in a preferred shape (step S19). Drying of the slurry-from mixture (slurry mixture) may involve use of a thermostatic chamber, a vacuum dryer, an infrared dryer, a hot air dryer, a suction dryer, or the like. Moreover, rapid drying is possible by suction filtration using an aspirator or the like.

The slurry mixture obtained by the production method of the present embodiment described above may be dried, without the applying step, to form a sheet and then processed into a desired shape. If the slurry mixture is formed in a preferred shape and then dried, the sheet-form carbon material can be processed into a desired shape. In addition, by applying in the applying step, it is possible to reduce the material cost such as cut ends generated by cutting process, and it is possible to obtain a carbon material having a preferred shape according to the user's preference. In addition, it is possible to increase the strength of the carbon material.

Note that the production method of the present embodiment does not have to include all processes. For example, one may use milled bacterially produced cellulose carbon subjected to the first milling step and earlier steps. The term "use" means distribution in that state. Similarly, the process may be performed up to the mixing step for distribution in the form of a slurry mixture.

For the purpose of confirming the effects of the production methods of the third embodiment and the fourth embodiment described above, experiments were conducted for comparing the carbon materials prepared by the production methods of the third embodiment and the fourth embodiment (Experimental Examples 1 to 3) with the carbon materials prepared by production methods different from the embodiments (Comparative Examples 1 and 2).

Experimental Example 1

Nata de coco (manufactured by Fujicco Co., Ltd.), used as a bacterial cellulose gel produced by the acetic acid bacteria *Acetobacter xylinum*, was immersed in liquid nitrogen for 30 minutes in a polystyrene foam box to completely freeze the bacterially produced gel. After completely freezing the bacterially produced gel, the frozen bacterially produced gel was taken out on a Petri dish, which was dried in a vacuum of 10 Pa or less with a freeze dryer (manufactured by TOKYO RIKAKIKAI CO., LTD.) to obtain a bacterially produced xerogel. After drying the bacterially produced xerogel in a vacuum, the bacterially produced xerogel was carbonized by being fired at 600° C. for 2 hours in a nitrogen atmosphere, to thereby prepare the carbon material of Experimental Example 1.

Experimental Example 2

The carbon material prepared in Experimental Example 1 was immersed in water, and then the carbon material and the bacterially produced gel (the weight ratio carbon material:bacterially produced gel was 1:1) were stirred for 12 hours with a homogenizer (manufactured by SMT CO., LTD.) to perform milling and mixing. This mixture was in a slurry form, and suction filtered using an aspirator (manufactured by SIBATA SCIENTIFIC TECHNOLOGY LTD.), and the carbon material was peeled from the filter paper. Thereafter, the carbon material was placed in a thermostatic chamber and subjected to drying treatment at 60° C. for 12 hours to prepare the carbon material of Experimental Example 2.

Experimental Example 3

Only the skin portion of the carbon material prepared in Experimental Example 1 was peeled off using a cutter to prepare the carbon material of Experimental Example 3.

Comparative Example 1

Comparative Example 1 is a carbon material prepared by normal drying without performing the above freezing step and the drying step.

In Comparative Example 1, the bacterially produced gel used in Experimental Example 1 was placed in a thermostatic chamber and subjected to drying treatment at 60° C. for 12 hours. Thereafter, the bacterially produced cellulose was carbonized by being fired at 600° C. for 2 hours under a nitrogen atmosphere, to thereby prepare a carbon material.

Comparative Example 2

The carbon material prepared in Comparative Example 1 (normal drying) was immersed in water and then milled by being stirred for 12 hours with a homogenizer (manufactured by SMT CO., LTD.), to thereby prepare a slurry having the carbon material dispersed therein. Then, the slurry and the bacterially produced gel (the weight ratio carbon material:bacterially produced gel was 1:1) were stirred for 12 hours to perform milling and mixing.

Thereafter, an aspirator (manufactured by SIBATA SCIENTIFIC TECHNOLOGY LTD.) was used for suction filtration, and the carbon material was peeled from the filter paper. After that, the carbon material was placed in a thermostatic chamber and subjected to drying treatment at 60° C. for 12 hours to prepare the carbon material of Comparative Example 2.

(Evaluation Method)

The obtained carbon materials were evaluated by performing XRD measurement, SEM observation, porosity measurement, tensile test, and BET specific surface area measurement. These carbon materials were confirmed to be single phase carbon (C, PDF card No. 01-071-4630) by XRD measurement. Note that the PDF card No is a card number in the PDF (Powder Diffraction File), which is a database collected by the International Centre for Diffraction Data (ICDD).

FIG. 8A to FIG. 8E illustrate SEM images of the prepared carbon materials. In addition, Table 2 presents the evaluation values obtained by measurement.

Figure 8A:
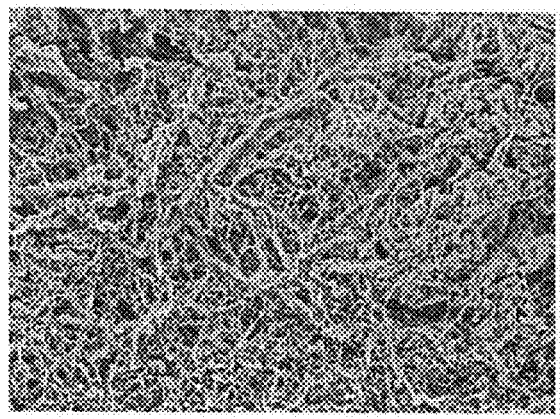
FIG. 8A is an SEM image of a skin portion of a carbon material obtained in Experimental Example 1.
Figure 8B:
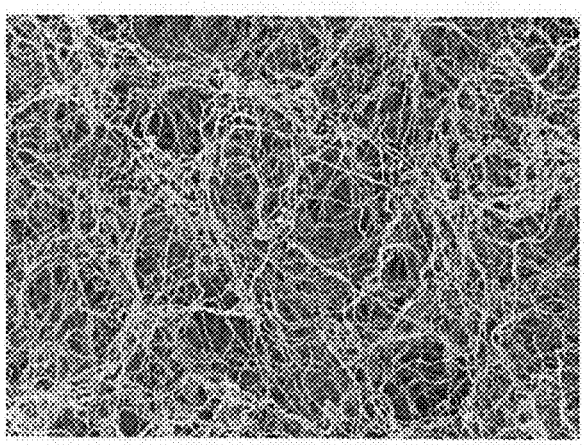
FIG. 8B is an SEM image of a cross section of the carbon material obtained in Experimental Example 1.
Figure 8C:
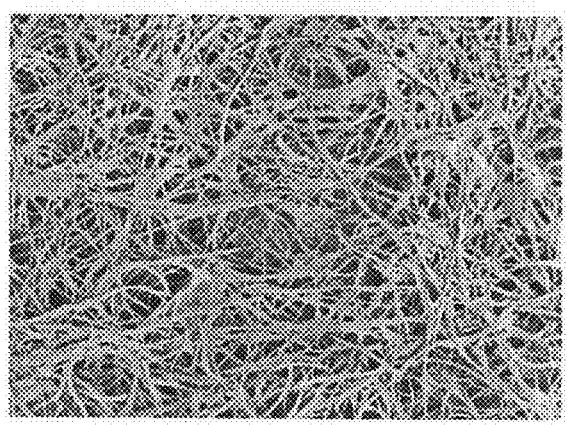
FIG. 8C is an SEM image of the carbon material obtained in Experimental Example 2.
Figure 8D:
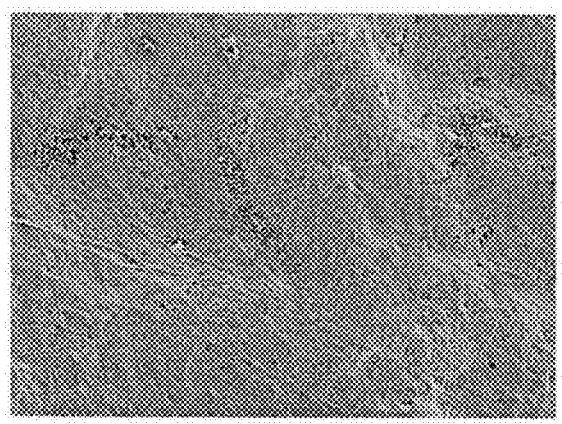
FIG. 8D is an SEM image of the carbon material obtained in Comparative Example 1.
Figure 8E:
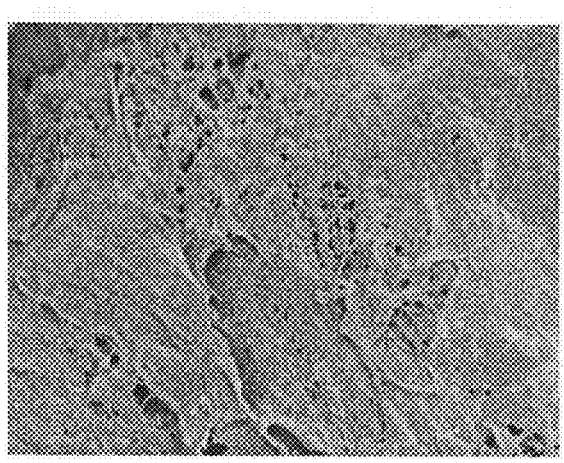
FIG. 8E is an SEM image of the carbon material obtained in Comparative Example 2.

FIG. 8A to FIG. 8E are SEM images of the carbon materials obtained in Experimental Examples 1 and 2 and Comparative Examples 1 and 2. FIG. 8A is an SEM image of the skin portion (surface) of the carbon material obtained in Experimental Example 1. As illustrated in FIG. 8A, agglomeration is observed in part of the skin portion of the carbon material of Experimental Example 1. FIG. 8B is an SEM image of a cross section cut to remove the skin portion of the carbon material of FIG. 8A. FIG. 8C is an SEM image of the surface of the carbon material obtained in Experimental Example 2. FIG. 8D is an SEM image of the surface of the carbon material obtained in Comparative Example 1. FIG. 8E is an SEM image of the surface of the carbon material obtained in Comparative Example 2. In any of the images, the magnification is 10000 times.

As illustrated in FIG. 8B and FIG. 8C (Experimental Examples 1 and 2), it can be confirmed that the carbon materials obtained by the production methods of the third embodiment and the fourth embodiment are a co-continuum formed by continuously connecting nanofibers having a fiber diameter of several tens of nm.

Meanwhile, as illustrated in FIG. 8D and FIG. 8E (Comparative Examples 1 and 2), it can be confirmed that the carbon materials obtained by normally drying the water-containing bacterially produced gel are a carbon material having no pores and densely agglomerated.

As presented in Table 2, the carbon materials of the third embodiment and the fourth embodiment (Experimental Examples 1 and 2) can more suppress agglomeration caused by the surface tension of water accompanying evaporation of the dispersion medium, as compared to the drying step of Comparative Examples 1 and 2 which perform normal drying. As a result, it has been confirmed that it is possible to provide a carbon material which has excellent performance with a high specific surface area and a high porosity.

In addition, Experimental Example 3 is a carbon material prepared by peeling the skin portion of the carbon material produced in Experimental Example 1 (FIG. 8A). The SEM image of Experimental Example 3 is the same as FIG. 8B. Thus, the carbon material of Experimental Example 3 has excellent performance with a high specific surface area and a high porosity. This is considered to be due to removal of the agglomerates in the skin portion observed in part of the skin portion of the carbon material obtained by the production method of Experimental Example 1 as illustrated in FIG. 8A.

TABLE 2

| Experimental Example/ Comparative Example | SEM Observation Result | Specific Surface Area | Porosity | Tensile Strength |
| --- | --- | --- | --- | --- |
| Experimental Example 1 | co-continuous Structure of 15 nmφ | 780 m$^2$/g | 90% or more | restored to original shape even when 80% strain was applied |
| Experimental Example 2 | co-continuous Structure of 30 nmφ | 500 m$^2$/g | 80% or more | confirmed to withstand tensile stress of 150 MPa |
| Comparative Example 1 | Condensed Carbon Material without Pores | 1 m$^2$/g | 10% or less | broken at tensile stress of 1 MPa or less |
| Comparative Example 2 | Condensed Carbon Material without Pores | 5 m$^2$/g | 10% or less | — |
| Experimental Example 3 | co-continuous Structure of 15 nmφ | 990 m$^2$/g | 98% or more | restored to original shape even when 80% strain was applied |

It has been confirmed that, as presented in Table 2, Experimental Example 1 has excellent stretchability even after carbonization. In addition, it has been confirmed that Experimental Example 2 has an excellent tensile strength.

As described above, the production methods of the third embodiment and the fourth embodiment include a freezing step of freezing a bacterially produced gel to obtain a frozen product, a drying step of drying the frozen product in a vacuum to obtain a dried product, and a carbonizing step of heating and carbonization in a gas atmosphere which does not burn the dried product. Since the bacterially produced cellulose is heat treated for carbonization, bacterially produced cellulose carbon produced by the third embodiment and the fourth embodiment can achieve an excellent specific surface area, strength, and porosity.

The carbon material produced by the production methods of the third embodiment and the fourth embodiment can also use cellulose derived from natural products, and has an extremely low environmental load. Since such a carbon material can be easily disposed of in daily life, it can be effectively used in various situations including small devices, sensor terminals, medical instruments, batteries, beauty instruments, fuel cells, biofuel cells, microbial batteries, capacitors, catalysts, solar cells, semiconductor manufacturing processes, filters, heat resistant materials, flame resistant materials, heat insulating materials, conductive materials, electromagnetic wave shielding materials, electromagnetic wave noise absorbing materials, heating elements, microwave heating elements, cone paper, clothes, carpets, mirror fogging prevention, sensors, touch panels, and the like.

Note that the present invention is not limited to the embodiments described above, and can be modified within the scope of its gist.

For example, as described in Example 3 of Table 1 and Table 2, the carbonizing step of the first embodiment and the third embodiment (see FIG. 1 and FIG. 5) may be followed by a removing step of peeling only the skin portion of the carbon material prepared in the carbonizing step using a cutter or the like.

Similarly, the carbonizing step of the second embodiment and the fourth embodiment (see FIG. 3 and FIG. 7) may be followed by a removing step of peeling only the skin portion of the carbon material prepared in the carbonizing step using a cutter or the like, and then the subsequent steps may be performed.

EXPLANATION OF THE REFERENCE NUMERALS

S1 dispersing step
S2 freezing step
S3 drying step
S4 carbonizing step
S5 milling step
S6 drying step

The invention claimed is:

1. A method of producing cellulose-nanofiber carbon by carbonizing a cellulose nanofiber, the method comprising:
   a gel generating step of generating a bacterially produced gel by dispersing the cellulose nanofiber using bacteria;
   a freezing step of freezing the gel containing the cellulose nanofiber to obtain a frozen product;
   a drying step of drying the frozen product in a vacuum to obtain a dried product;
   a carbonizing step of heating and carbonizing the dried product in an atmosphere which does not burn the dried product to obtain cellulose-nanofiber carbon;
   a first milling step of milling the dried product carbonized in the carbonizing step;
   a second milling step of milling the bacterially produced gel produced in the gel generating step; and
   a mixing step of mixing materials milled in the first milling step and the second milling step.

2. The method of producing cellulose-nanofiber carbon according to claim 1, further comprising:
   an applying step of applying a mixture mixed in the mixing step to form a preferred shape; and
   a drying step of removing liquid from the mixture.

* * * * *